(12) United States Patent
Coscarella

(10) Patent No.: US 11,114,831 B2
(45) Date of Patent: Sep. 7, 2021

(54) FLASHING HOOD FOR UTILITY LINES

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 16/453,410

(22) Filed: Jun. 26, 2019

(65) Prior Publication Data
US 2019/0393690 A1 Dec. 26, 2019

Related U.S. Application Data

(60) Provisional application No. 62/690,208, filed on Jun. 26, 2018.

(51) Int. Cl.
*H02G 3/22* (2006.01)
*E04F 13/08* (2006.01)
*H02G 15/013* (2006.01)
*F16L 5/02* (2006.01)

(52) U.S. Cl.
CPC ........... *H02G 3/22* (2013.01); *E04F 13/0869* (2013.01); *F16L 5/02* (2013.01); *H02G 15/013* (2013.01)

(58) Field of Classification Search
CPC ......... E04F 13/0869; F16L 5/02; F24F 13/02; H02G 3/22; H02G 15/013
USPC .......................................... 52/62, 220.8, 232
See application file for complete search history.

(56) References Cited

U.S. PATENT DOCUMENTS

| | | | | |
|---|---|---|---|---|
| 5,560,618 A | * | 10/1996 | Wambeke | F16L 5/02 277/314 |
| 6,070,928 A | * | 6/2000 | Campbell | B60R 13/0275 174/152 G |
| 7,305,801 B2 | * | 12/2007 | Gilleran | F24F 1/0003 174/480 |
| 7,730,681 B2 | | 6/2010 | Gilleran | |
| 8,307,590 B2 | * | 11/2012 | Smith | E04D 13/1407 52/198 |
| 9,109,359 B1 | | 8/2015 | Coscarella | |
| 9,140,002 B2 | | 9/2015 | Coscarella | |
| 9,337,647 B2 | * | 5/2016 | Gilleran | H02G 3/22 |
| 9,404,606 B2 | | 8/2016 | Coscarella | |
| 9,523,200 B2 | * | 12/2016 | Lechuga | E04C 2/52 |
| 9,651,174 B2 | * | 5/2017 | Lechuga | E04C 2/52 |
| 9,883,602 B2 | | 1/2018 | Coscarella | |
| 10,018,287 B2 | | 7/2018 | Coscarella | |
| 10,044,179 B2 | | 8/2018 | Coscarella | |
| 10,051,756 B2 | | 8/2018 | Coscarella | |

(Continued)

*Primary Examiner* — Brian E Glessner
*Assistant Examiner* — Adam G Barlow
(74) *Attorney, Agent, or Firm* — Christensen O'Connor Johnson Kindness PLLC

(57) ABSTRACT

A flashing hood for utility lines passing through a wall of a building has a plate body with a plate opening surrounded by an enclosed hood body. The bottom of the enclosed hood body has a sidewall with a seal-receiving profile and a cover-receiving profile spaced from the plate body and above the seal-receiving profile. The enclosed hood body has a removable seal that engages the seal-receiving profile, the removable seal having a sealing profile that seals against one or more utility lines when installed. The hood body also has a removable cover that engages the cover-receiving profile and secures the removable seal in engagement with the seal-receiving profile. The sidewall, the removable seal, and the removable cover define an enclosure. When the removable cover and seal are removed, the sidewall defines an access opening that surrounds the plate opening.

5 Claims, 26 Drawing Sheets

(56) References Cited

U.S. PATENT DOCUMENTS

| | | |
|---|---|---|
| 10,787,804 B2 | 9/2020 | Coscarella |
| 2006/0027388 A1* | 2/2006 | Collins .................... F16L 5/02 |
| | | 174/663 |
| 2013/0231042 A1 | 9/2013 | Coscarella |
| 2013/0234404 A1 | 9/2013 | Coscarella |
| 2014/0259974 A1* | 9/2014 | Gilleran ............... H02G 15/013 |
| | | 52/62 |
| 2017/0104322 A1* | 4/2017 | Scheuer .................. F16L 5/02 |
| 2017/0241572 A1* | 8/2017 | Muenzenberger ........ F16L 5/02 |
| 2017/0305366 A1* | 10/2017 | Ujita ...................... B60R 16/02 |
| 2018/0265018 A1* | 9/2018 | Yabashi .................. F16L 5/10 |
| 2018/0297542 A1* | 10/2018 | Schwimmbeck ......... F16L 5/02 |
| 2019/0020184 A1 | 1/2019 | Coscarella |

\* cited by examiner

FLASHING HOOD FOR UTILITY LINES

TECHNICAL FIELD

This relates to providing a vapour barrier around a building, and in particular, providing flashing around utility lines such as for air conditioning.

BACKGROUND

In the construction of buildings, vapour barriers are provided to seal between the exterior of the building and the interior. In various situations, it is required to pass building components through the vapour barrier. In order to maintain the building envelope, these penetrations through the vapour barrier are typically sealed around the component. Central air conditioners are often used to cool indoor spaces, and are typically installed with an exterior compressor, and a number of utility lines, including refrigerant lines and electrical lines that extend from the compressor through an exterior wall of a building. U.S. Pat. No. 7,305,801 (Gilleran) entitled AIR CONDITIONING LINE FLASHING PANEL teaches a flashing panel for use in sealing around the utility lines of an air conditioner.

SUMMARY

According to an aspect, there is provided a flashing hood for utility lines passing through a wall of a building, the flashing hood comprising a plate body having a plate opening extending therethrough, and an enclosed hood body that surrounds the plate opening, the enclosed hood body comprising a sidewall having a seal-receiving profile along a bottom of the enclosed hood body, and a cover-receiving profile that is spaced from the plate body and above the seal-receiving profile, a removable seal that engages the seal-receiving profile, the removable seal having a sealing profile that seals against one or more utility lines when installed, and a removable cover that engages the cover-receiving profile, wherein the removable cover secures the removable seal in engagement with the seal-receiving profile, the sidewall, the removable seal, and the removable cover define an enclosure, and when the removable cover and the removable seal are removed, the sidewall defines an access opening that surrounds the plate opening.

According to other aspects, the removable seal may be rectangular and the sealing profile of the removable seal may be circular, the removable seal may be bisected through the sealing profile, and the removable cover may be attached to the sidewall using fasteners.

According to an aspect, there is provided a flashing hood for utility lines passing through a wall of a building, the flashing hood comprising a plate body having a plate opening extending therethrough, a hood body having a sidewall that defines a utility passage having a first end in communication with the plate opening and a second end that is spaced from the first end, the utility passage extending at an angle relative to the plate body, and an extension that is supported by the hood body to vary the length the utility passage of the hood body.

According to other aspects, the extension may comprise an extendible sleeve that telescopically engages the sidewall of the hood body to vary the length of the utility passage of the hood body, the extension may be slidably received within the hood body, the extension may attach to the second end of the hood body to extend the length of the utility passage, the hood body may comprise a moulding profile having a rectangular cross section and may be raised away from the plate body, the flashing hood may further comprise an impermeable flexible layer mounted to the plate body on a side of the plate body opposite the hood body, and the impermeable flexible layer may have a sealing aperture that seals against one or more utility lines when installed, and the flashing hood may further comprise a resilient seal insertable within an end of the extendable sleeve, and the resilient seal may have a sealing profile that seals against one or more utility lines when installed.

According to an aspect, there is provided a flashing hood for utility lines passing through a wall of a building, the flashing hood comprising a plate body having a plate opening extending therethrough, a hood body having a sidewall that defines a utility passage having a first end in communication with the plate opening and a second end that is spaced from the first end, the utility passage extending at an angle relative to the plate body, and an impermeable flexible layer mounted to the plate body on a side of the plate body opposite the hood body, the impermeable flexible layer having a sealing aperture that seals against one or more utility lines when installed.

According to other aspects, the wall of the building may be covered with a barrier material and the impermeable flexible layer may overlap the barrier material on the wall of the building.

According to an aspect, there is provided in combination a utility line passing through a wall of a building, the utility line having an outer perimeter, and a flashing hood comprising a plate body having a plate opening extending therethrough, and a hood body having a sidewall that defines a utility passage having a first end in communication with the plate opening and a second end that is spaced from the first end, the utility passage extending at an angle relative to the plate body, wherein the utility line passes through the utility passage of the flashing hood, and an interior perimeter of the utility passage is sized to provide a friction fit against the utility line.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Various embodiments of a flashing hood for utility lines will now be described with reference to FIG. 1 through 28. The described flashing hoods may be used for air conditioning lines, drain pipes, electrical cables, or other utility lines that pass between an interior and an exterior of a structure. The flashing hoods will be described generally as being placed on an exterior of a wall, however, it will be understood that the flashing hood embodiments described may equally be used on the interior of a wall.

Figure 1:
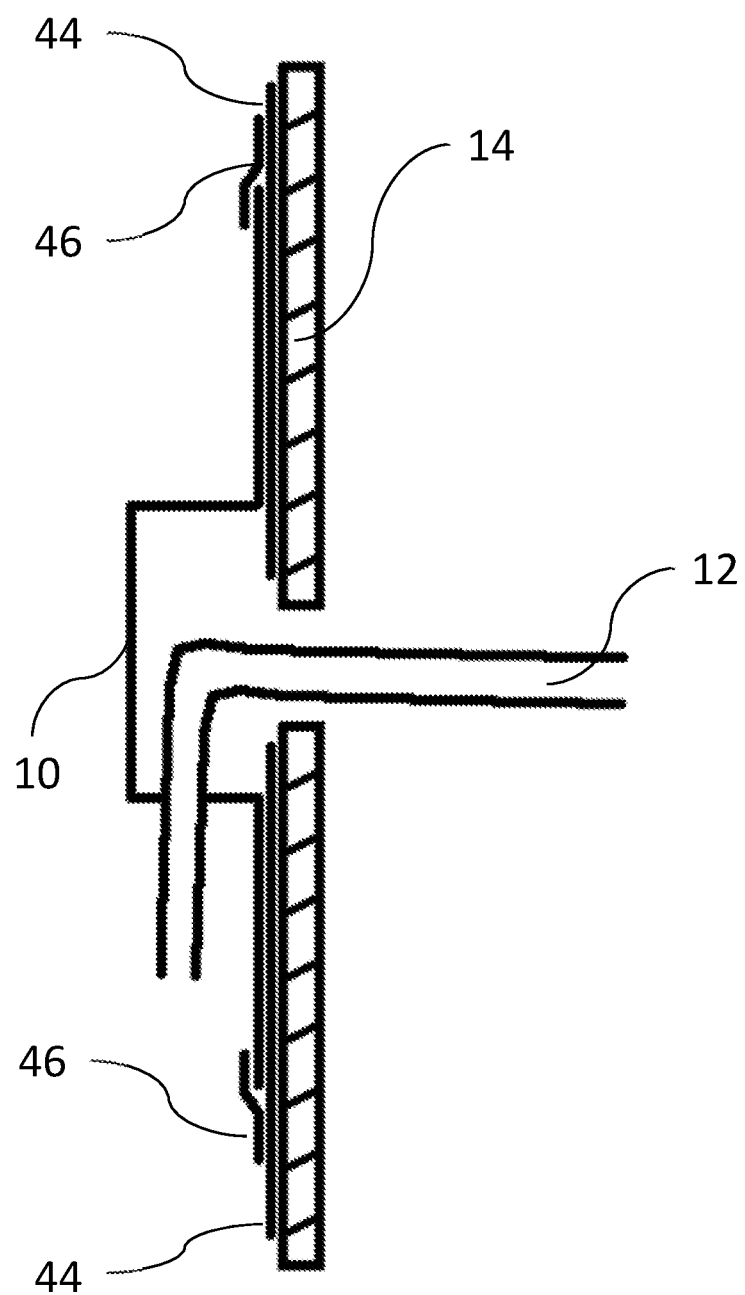
FIG. 1 is a side elevation view in cross section of a flashing hood for utility lines with a utility line.
Figure 2:
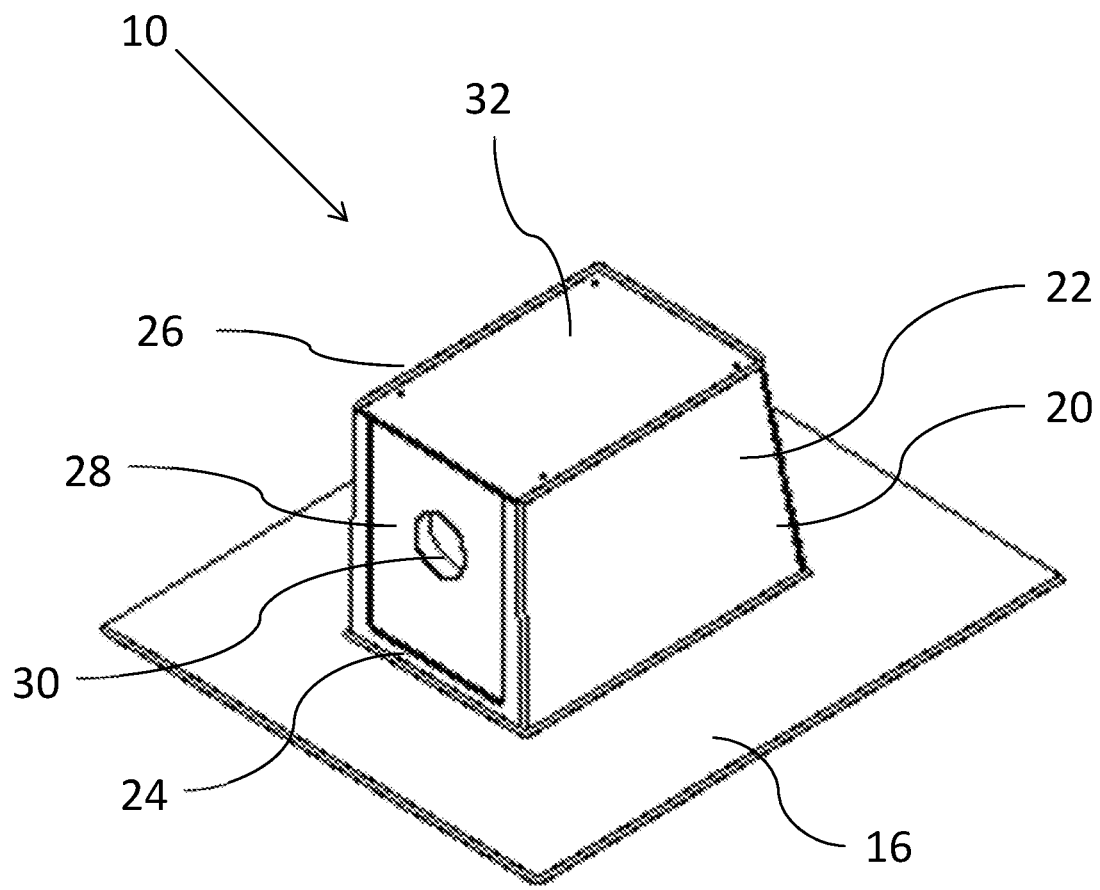
FIG. 2 is a perspective view of a flashing hood for utility lines.
Figure 3:
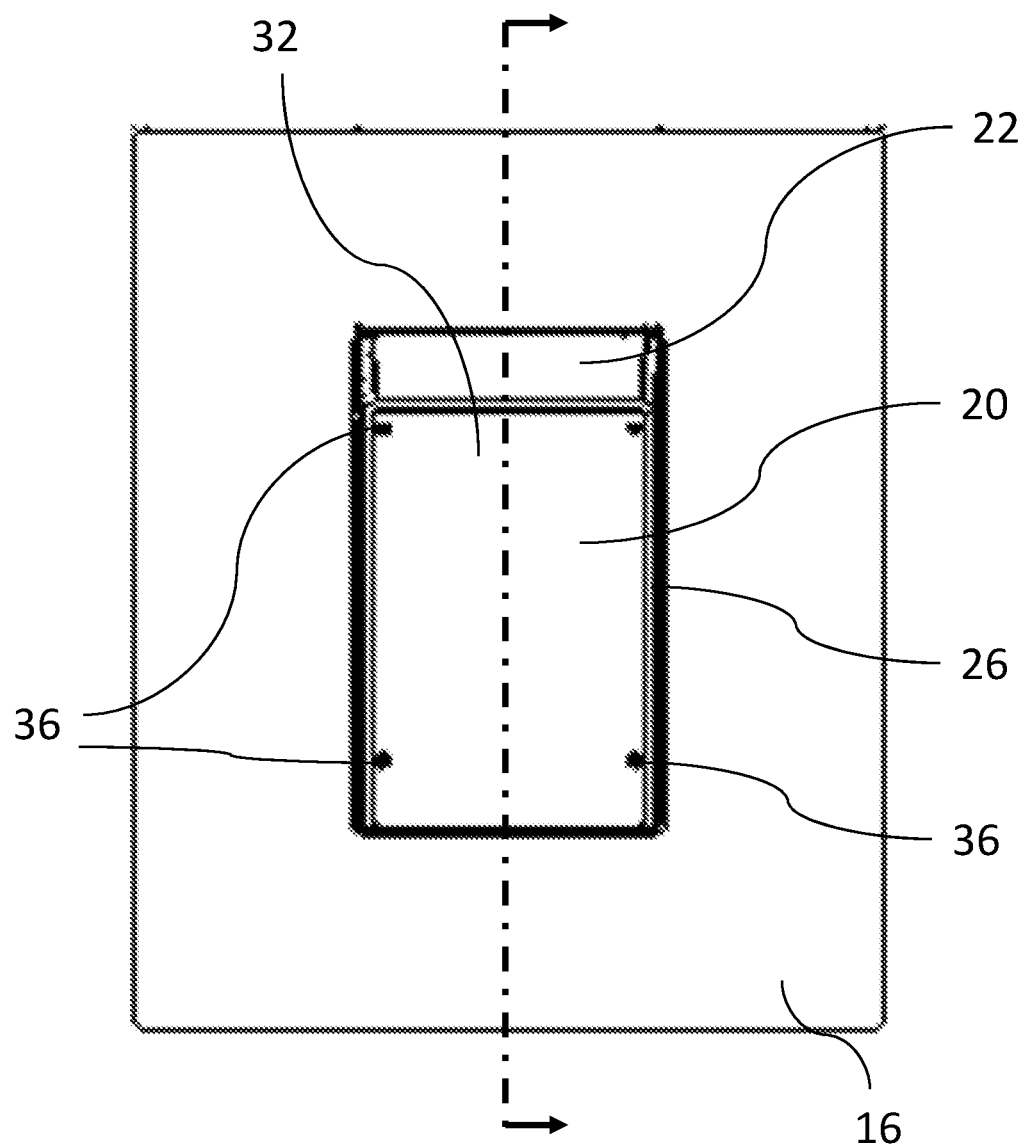
FIG. 3 is a front elevation view of the flashing hood of FIG. 2.
Figure 4:
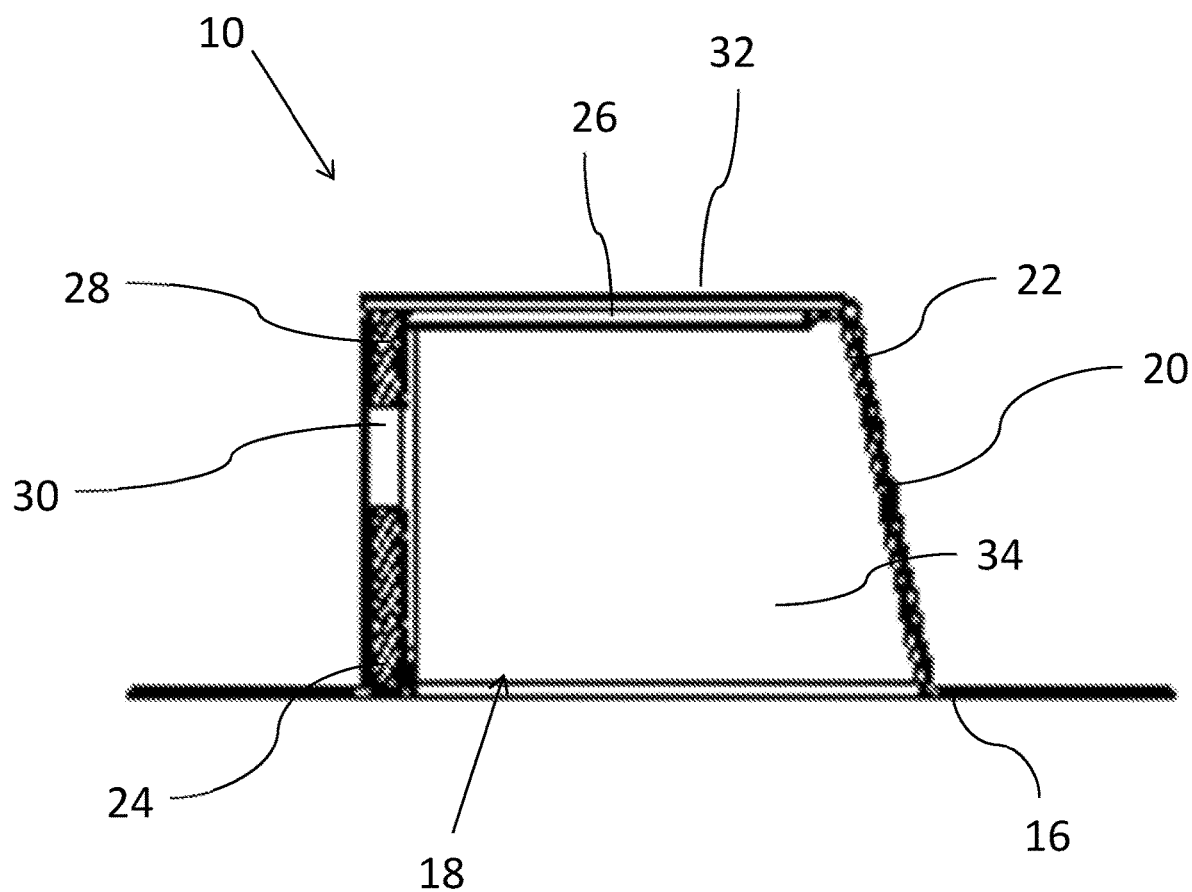
FIG. 4 is a side elevation view in cross section of the flashing hood of FIG. 2.
Figure 5A:
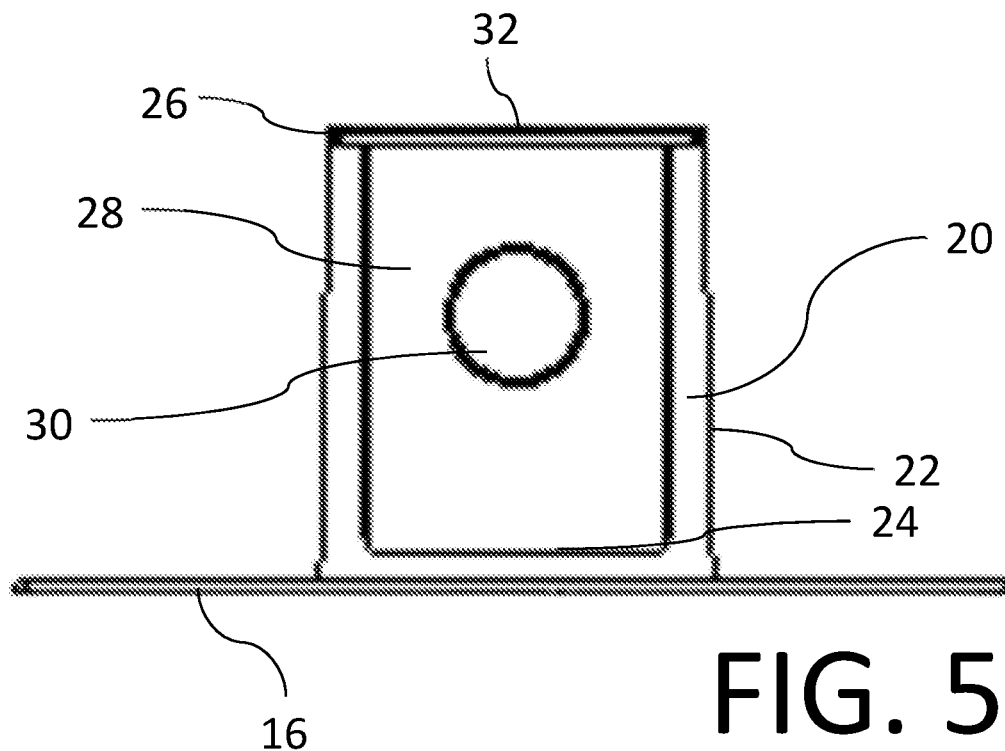
FIG. 5a is a bottom plan view of the flashing hood of FIG. 2.
Figure 5B:
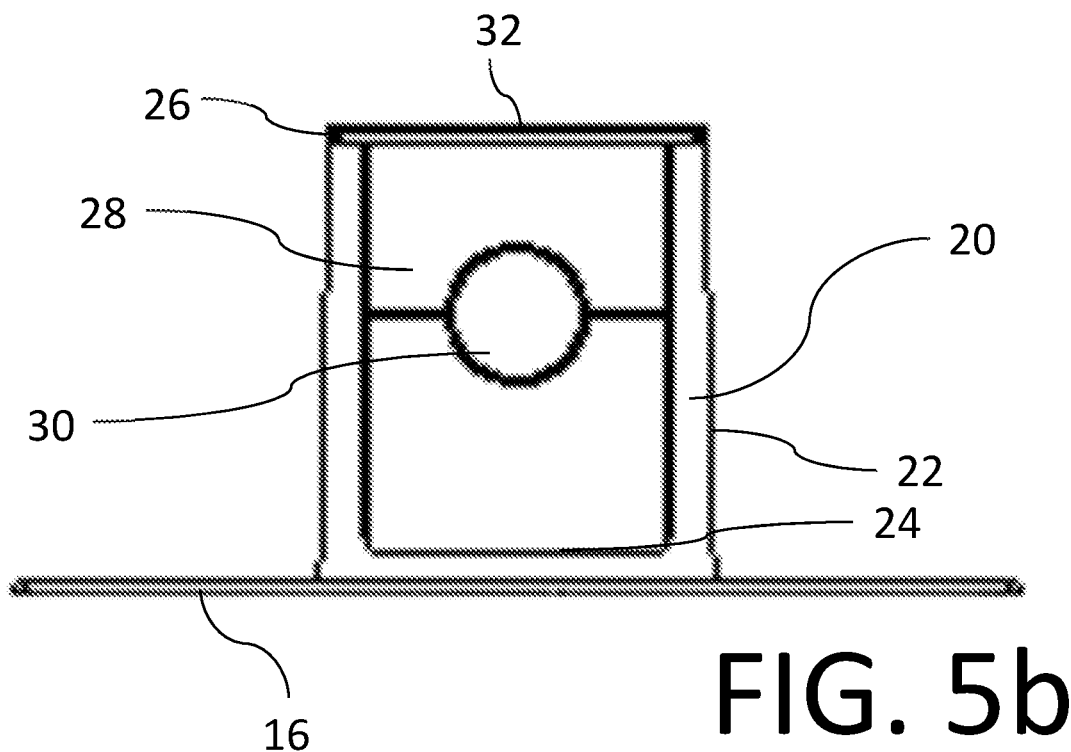
FIG. 5b is a bottom plan view of the flashing hood of FIG. 2 with a two part seal.
Figure 27:
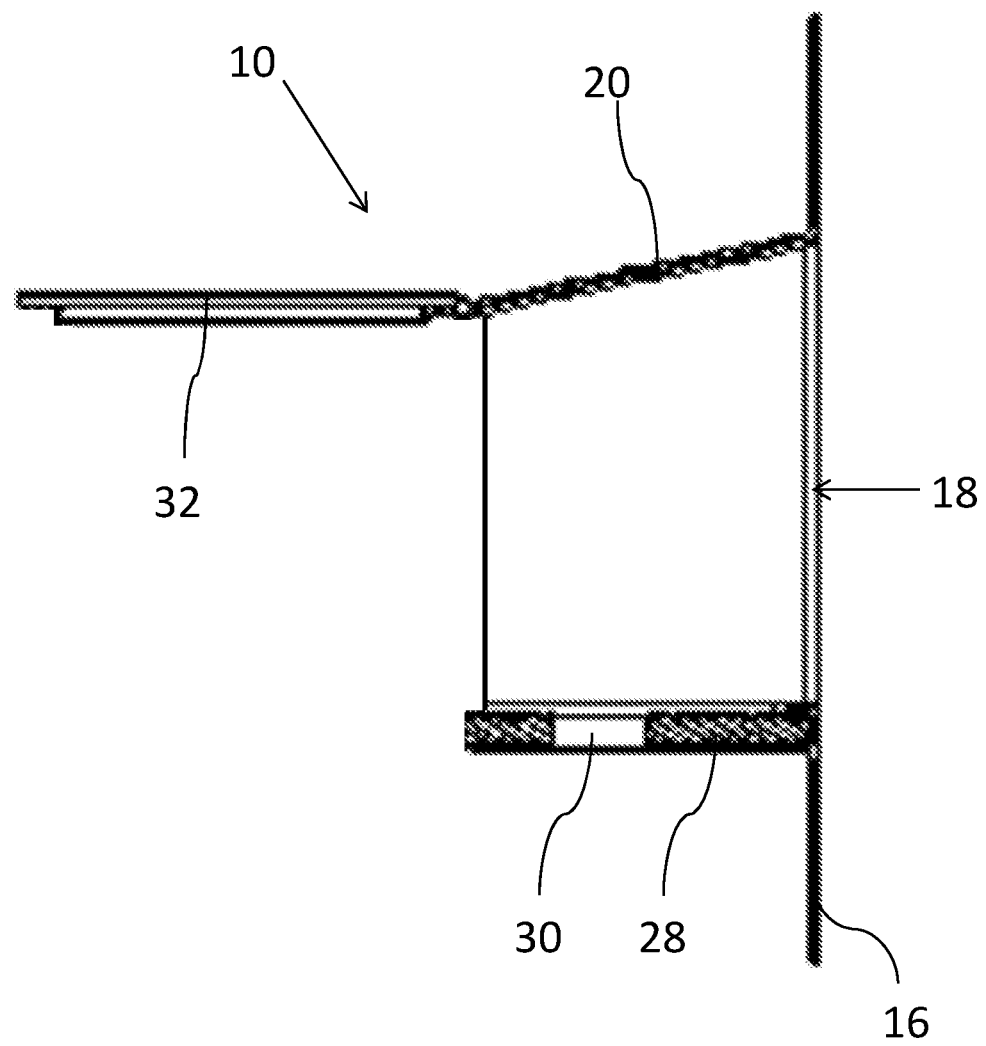
FIG. 27 is a cross-sectional side elevation view of a flashing hood having a pivotally connected cover.
Figure 28:
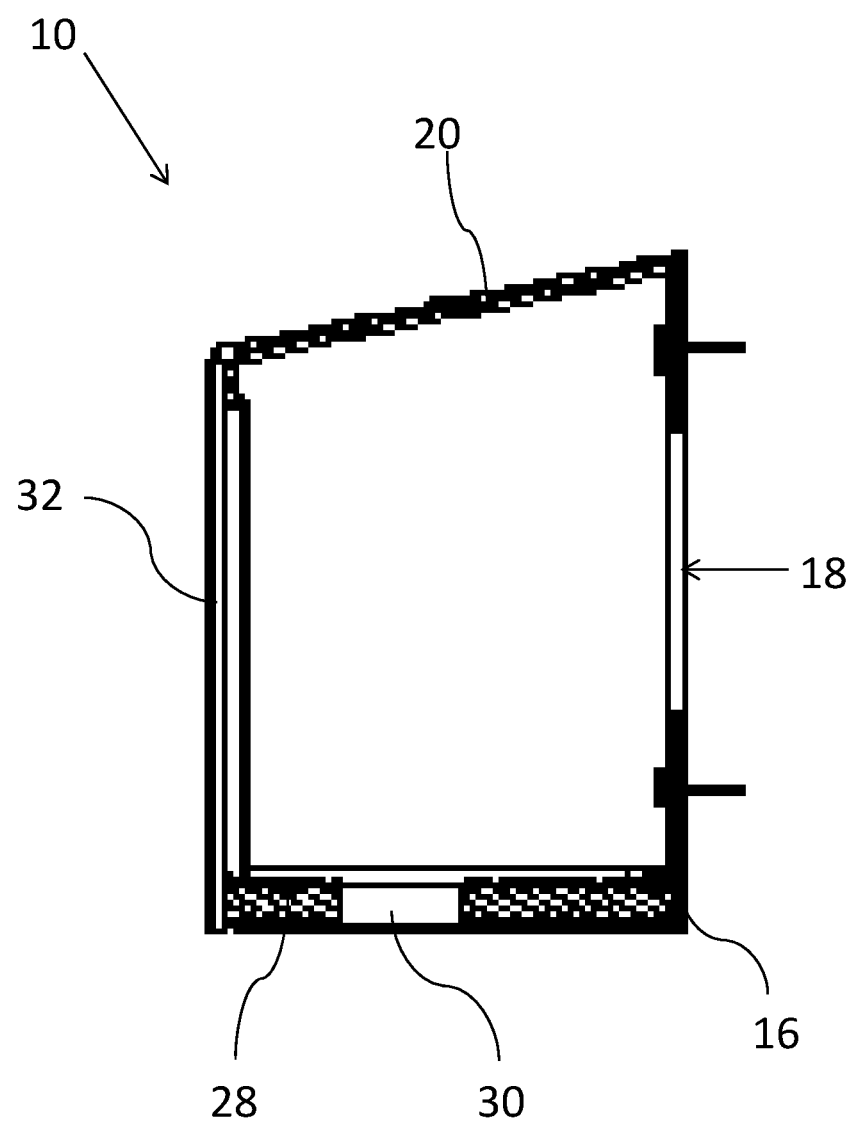
FIG. 28 is a cross-sectional side elevation view of a flashing hood having an inside flange.

Referring to FIG. 1, in a first embodiment, a flashing hood 10 for utility lines 12 passing through a wall of a building 14 is shown. Referring to FIGS. 1-5, and 7-9, flashing hood 10 has a plate body 16 with a plate opening 18 extending therethrough. Flashing hood 10 also has an enclosed hood body 20 that surrounds plate opening 18. Plate body 16 may either extend outward from hood body 20, or inward inside hood body 20 to define plate opening 18, as shown in FIG. 28. Enclosed hood body 20 has a sidewall 22 with a seal-receiving profile 24 along a bottom of enclosed body 20 and a cover-receiving profile 26 that is spaced from plate body 16 and is above seal-receiving profile 24. Removable seal 28 engages seal-receiving profile 24, and has a sealing profile 30 that seals against one or more utility lines 12 when installed. As shown, removable seal 28 is rectangular and sealing profile 30 is circular. However, it will be understood that removable seal 28 and sealing profile 30 may take different shapes depending on the requirements of the application, and sealing profile 30 may include more than one opening. Removable seal 28 may have a slot that allows it to be installed around piping or cables, or may be a two part seal, as shown in FIG. 5b. As shown in FIG. 5b, removable seal 28 is bisected relative to sealing profile 30, allowing it to be placed around a utility line 12. Removable cover 32 engages cover-receiving profile 26 and removable cover 32 secures removable seal 28 in engagement with seal-receiving profile 24. Removable cover 32 may be attached to sidewall 22 using fasteners 36, or it may be attached by other means, such as through the use of adhesive tape or a snap fit. In addition, removable cover 32 may be pivotally connected to hood body 20, as shown in FIG. 27. Sidewall 22, removable seal 28, and removable cover 32 define an enclosure 34 within enclosed body 20, and when removable cover 32 and removable seal 28 are removed, sidewall 22 defines an access opening that surrounds plate opening 18.

Figure 7:
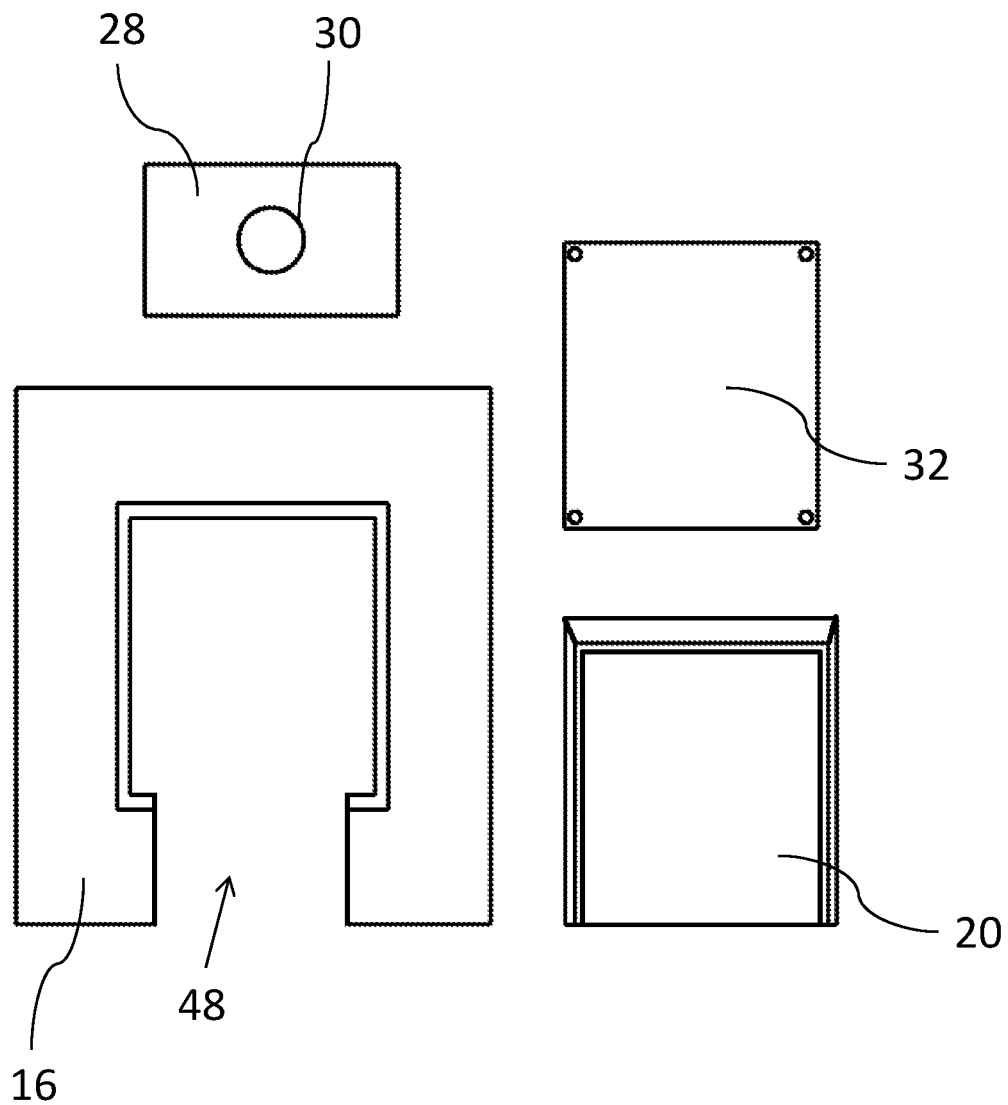
FIG. 7 is an exploded front elevation view of a flashing hood for utility lines with the component parts separated.
Figure 8:
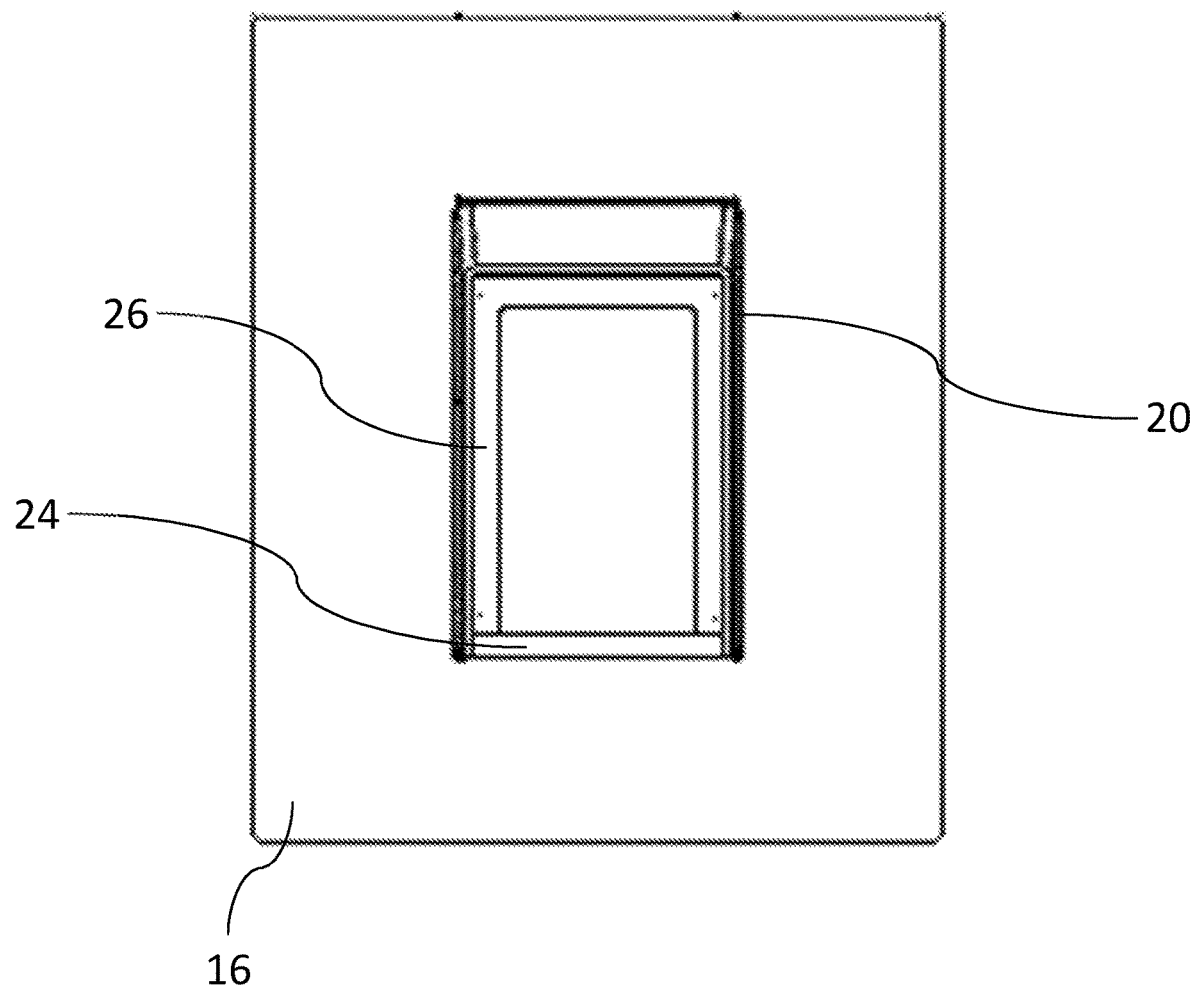
FIG. 8 is a front elevation view of a flashing hood with a lid and seal element removed.

Referring to FIG. 7, flashing hood 10 may be designed to slide over a protrusion from a wall 14. In this embodiment an opening 48 is provided in plate body 16 to allow plate body 16 to slide over utility lines 12, and enclosed body 20 is separate and able to be attached onto plate body 16 after plate body 16 is installed. Removable seal 28 can then be installed, and removable cover 32 attached to enclosed body 20. Referring to FIG. 8, enclosed body 20 may be provided with a slot as seal-receiving profile 24, and a recessed area as cover-receiving profile 26.

Figure 10:
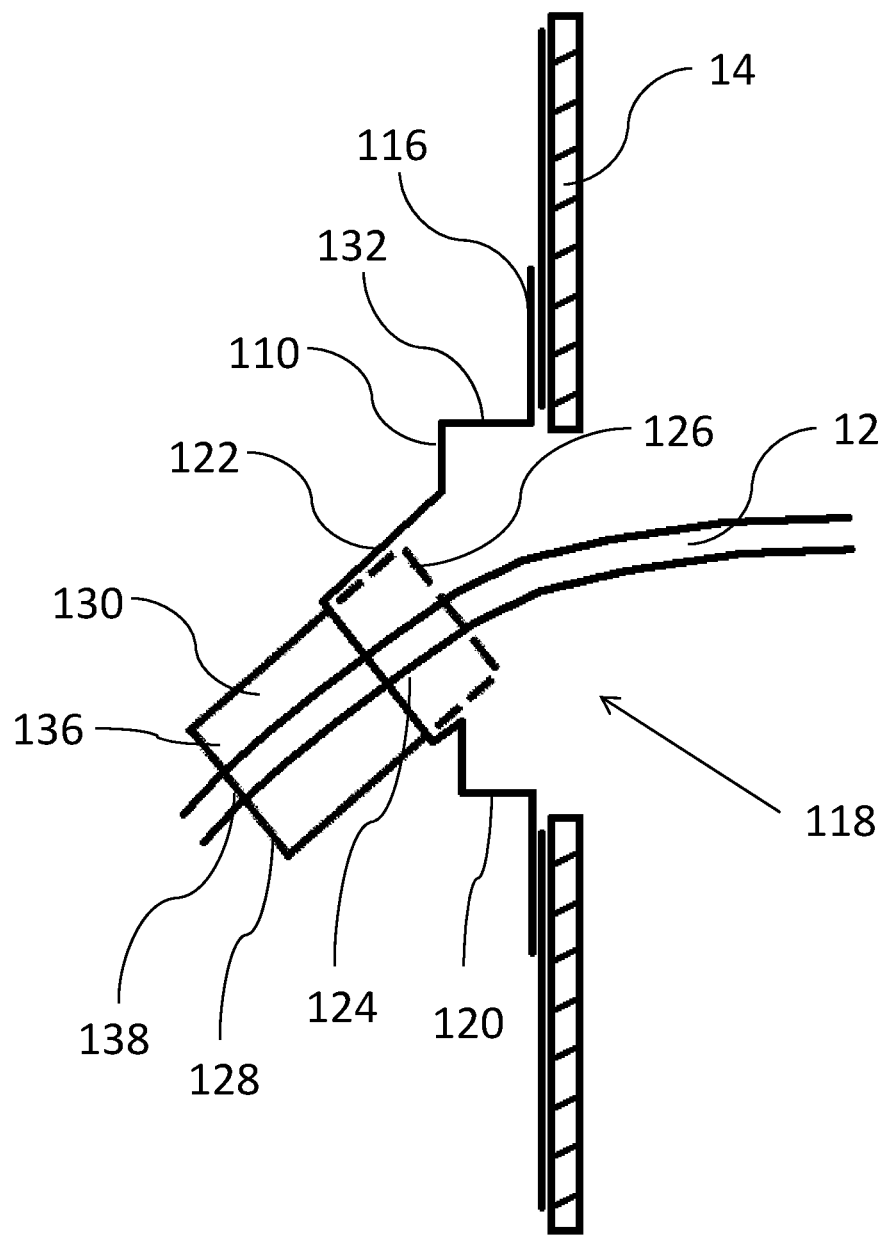
FIG. 10 is a side elevation view in cross section of a flashing hood for utility lines with a utility line and an extension.

Referring to FIG. 10, another embodiment is shown of a flashing hood 110 for utility lines 12 passing through a wall of a building 14. Flashing hood 110 has a plate body 116 having a plate opening 118 extending therethrough, and a hood body 120 having a sidewall 122 that defines a utility passage 124 having a first end 126 in communication with plate opening 118 and a second end 128 spaced from first end 126, utility passage 124 extending at an angle relative to plate body 116. An extension 130 is supported by hood body 120 to vary the length of utility passage 124 of hood body 120. It will be understood that extension 130 may be telescopically received, such that extension 130 is an extendible sleeve that telescopically engages sidewall 122 of hood body 120 to vary the length of utility passage 124 of hood body 120 as shown in FIG. 10. Alternatively, referring to FIGS. 23 and 24, extension 130 may be a fixed component such as hood extension 222 that attaches to the second end 128 of hood body 120 to extend the length of utility passage 124. It will also be understood that while extension 130 is shown in different embodiments as having either a rectangular or a round cross section, these shapes are interchangeable, and either the telescopic extension or the hood extension may be provided as round, rectangular, or as any other shape that is known in the art.

Figure 14:
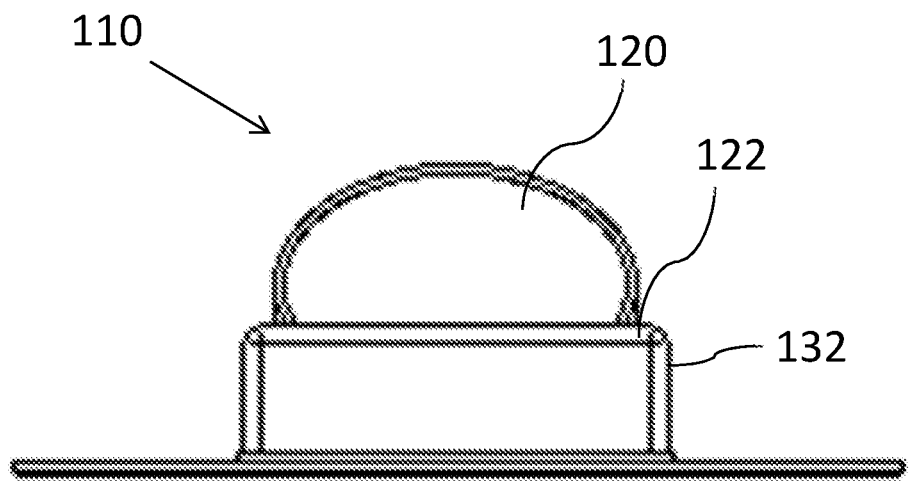
FIG. 14 is a bottom elevation view of the flashing hood of FIG. 13.
Figure 15:
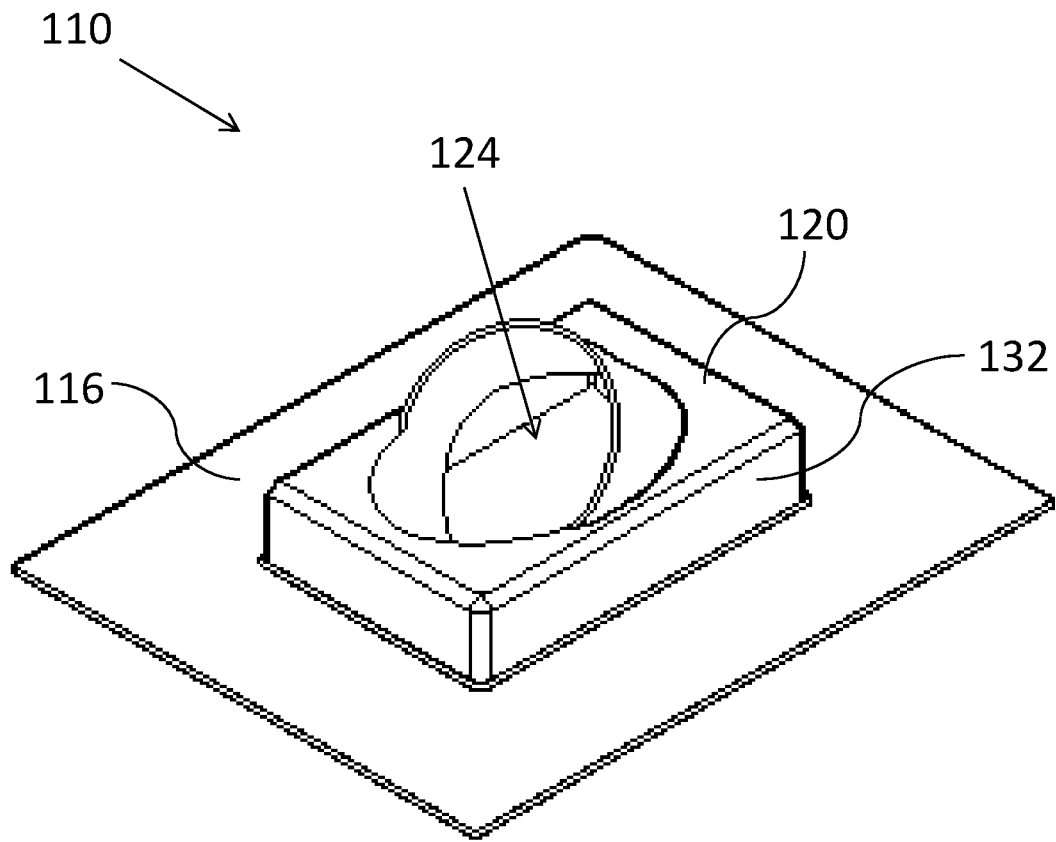
FIG. 15 is a perspective view of the flashing hood of FIG. 13.
Figure 16:
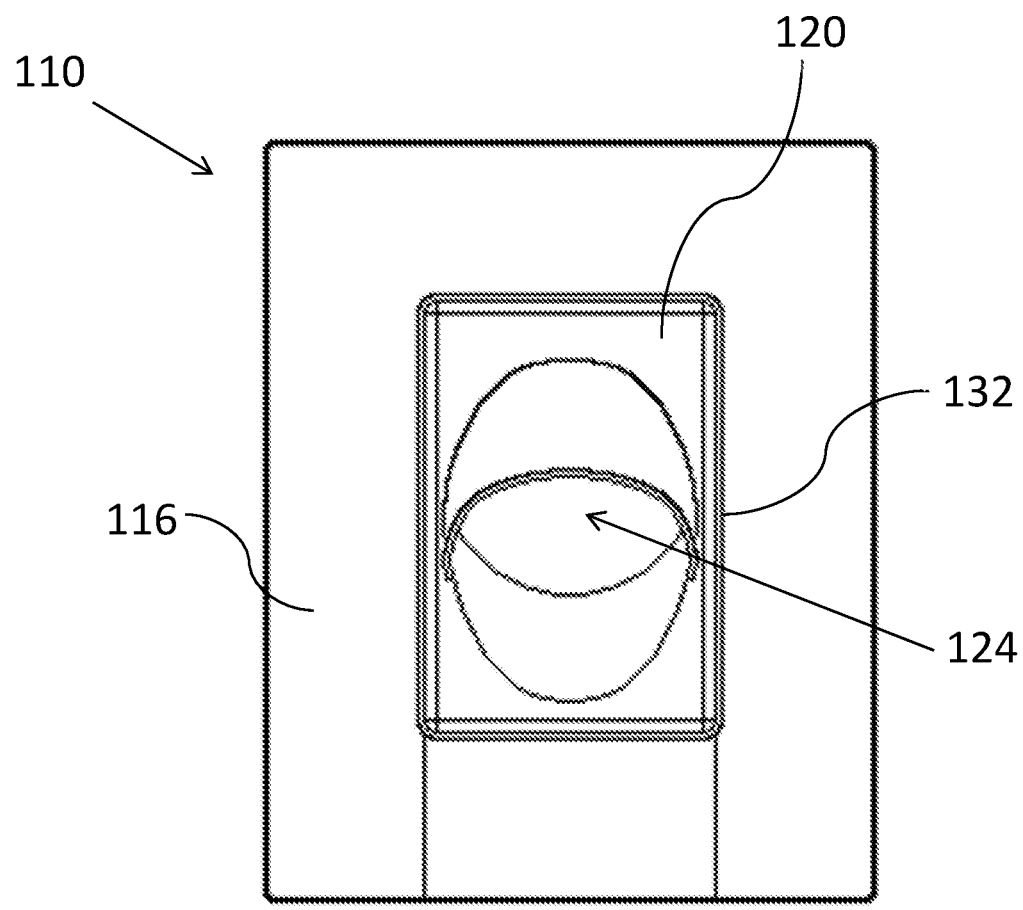
FIG. 16 is a front elevation view of the flashing hood of FIG. 13.

Referring to FIG. 14, flashing hood 110 may be shaped such that extendible sleeve 130 may be received in different positions depending on the diameter of extendible sleeve 130. As shown, a first diameter of extendible sleeve 130 fits through utility passage 124 at a first angle, and a second diameter of extendible sleeve 130 fits through utility passage 124 at a second angle. Referring to FIG. 13 through FIG. 16, an embodiment of flashing hood 110 is shown with extendible sleeve 130 removed.

There will now be described certain variations to the flashing hoods. While the variations are depicted with respect to particular embodiments, it will be understood that the variations, and other design aspects described herein, may be combined with the embodiment described herein in any reasonable combination.

Figure 6A:
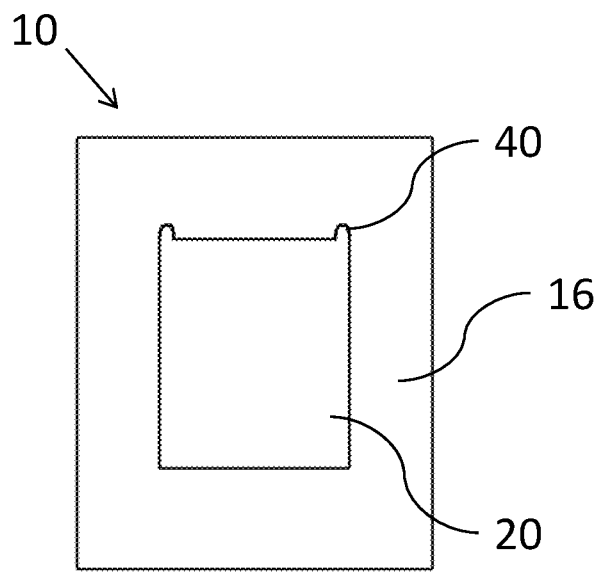
FIG. 6a and FIG. 6b are front plan views of flashing hoods for utility lines having drainage structures.
Figure 6B:
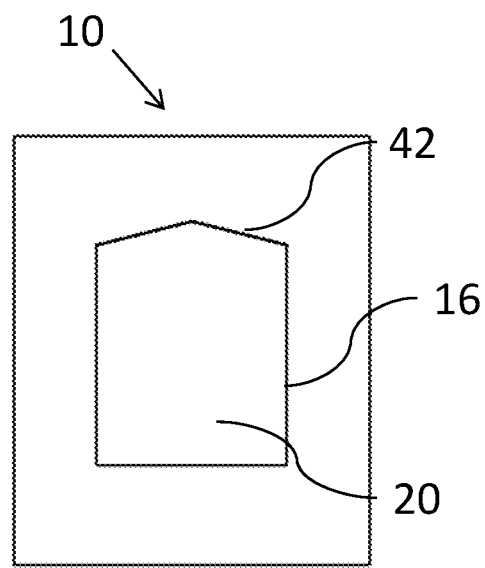

Referring to FIG. 6a and FIG. 6b, flashing hood 10 may have a profile to direct water, such as drainage flanges 40, or a sloped upper surface 42, on the top of enclosed body 20. Drainage flanges 40 or sloped upper surface 42 may be provided to direct the flow of water as it moves across flashing hood 10, and may be positioned to reduce the risk of water travelling behind flashing hood 10. Referring to FIG. 1, flashing hood 10 may be used in combination with building wrap 44 previously installed on the outer surface of wall 14 to ensure the building is protected from exposure to water. For example, plate body 16 may be overlapped with building wrap material 44 and attached using flashing tape 46. Flashing hood 10 may also be installed in other ways, as will be understood by those skilled in the art. For example, it may not be necessary to tape using flashing tape 46, where the attachment of flashing hood 10 is sufficient to prevent passage of moisture. Flashing hood 10 may also be placed on wall 14 with building wrap 44 overlapping on top of plate body 16.

Figure 11:
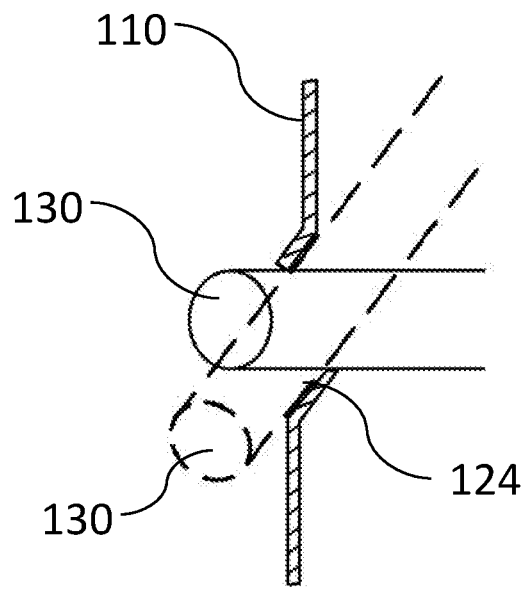
FIG. 11 is a side elevation view in cross section of a flashing hood for utility lines having an extension with two possible configurations.
Figure 12:
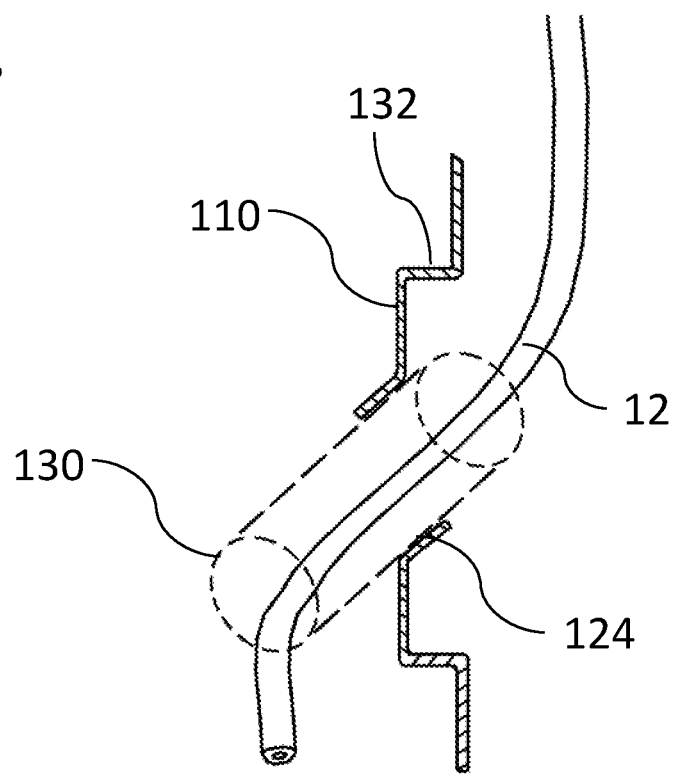
FIG. 12 is a side elevation view in cross section of a flashing hood for utility lines with an extension.
Figure 13:
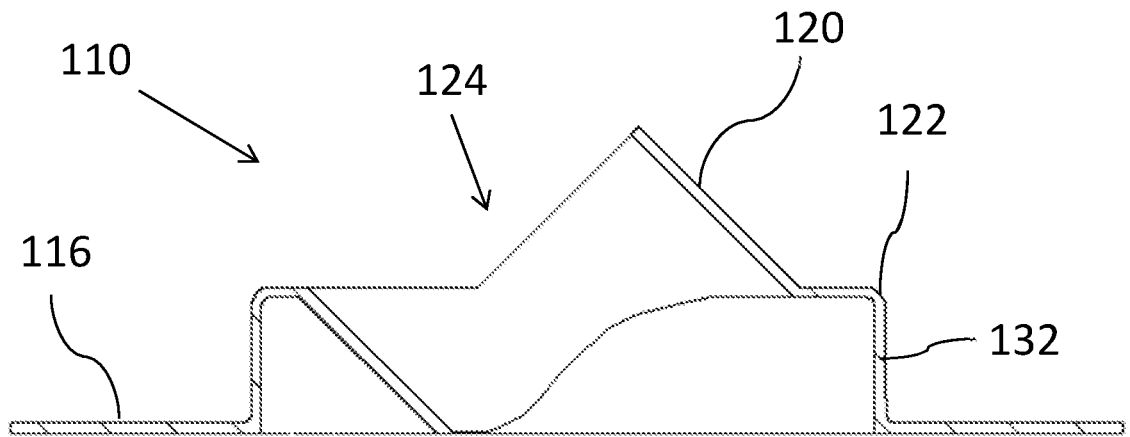
FIG. 13 is a side elevation view of in cross section of an alternative flashing hood for utility lines.

Referring to FIG. 12, flashing hood 110 is shown with a moulding profile 132, and in FIG. 11, without moulding profile 132. If provided, moulding profile 132 preferably has a rectangular cross section and is raised away from plate body 116, which allows it to be aligned with a siding material, such as brick or stucco, and provide a surface to flashing hood 110 that is flush with the siding material. The height of moulding profile 132 may be varied based on the type of siding material being used on the building, and the cross sectional shape may be varied depending on the application and the material used to form hood body 120. Flashing hood 10 as shown in FIG. 1 may also be provided with a moulding profile, however as the depicted design has a rectangular peripheral edge, it may not be required.

Figure 9:
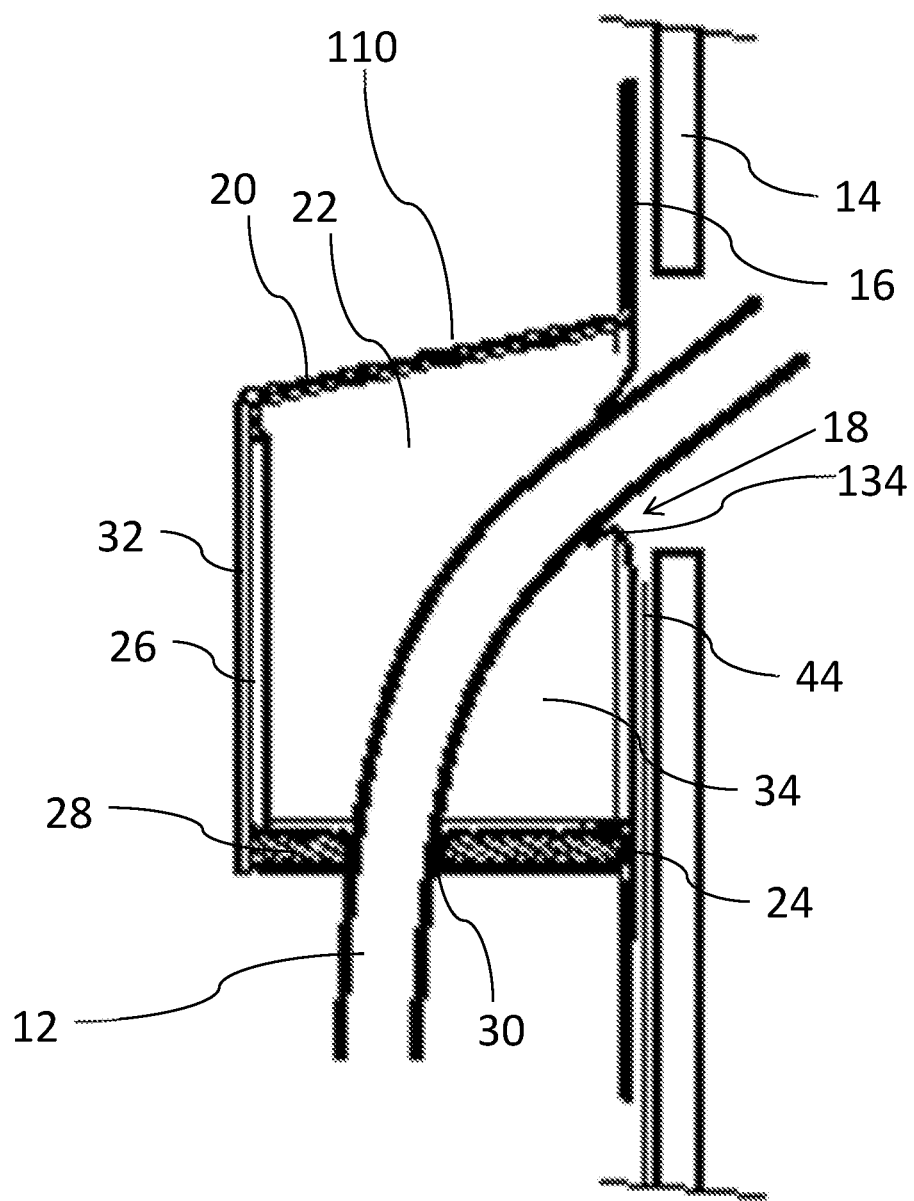
FIG. 9 is a perspective view of another alternative flashing hood over an impermeable flexible layer around utility lines.
Figure 17:
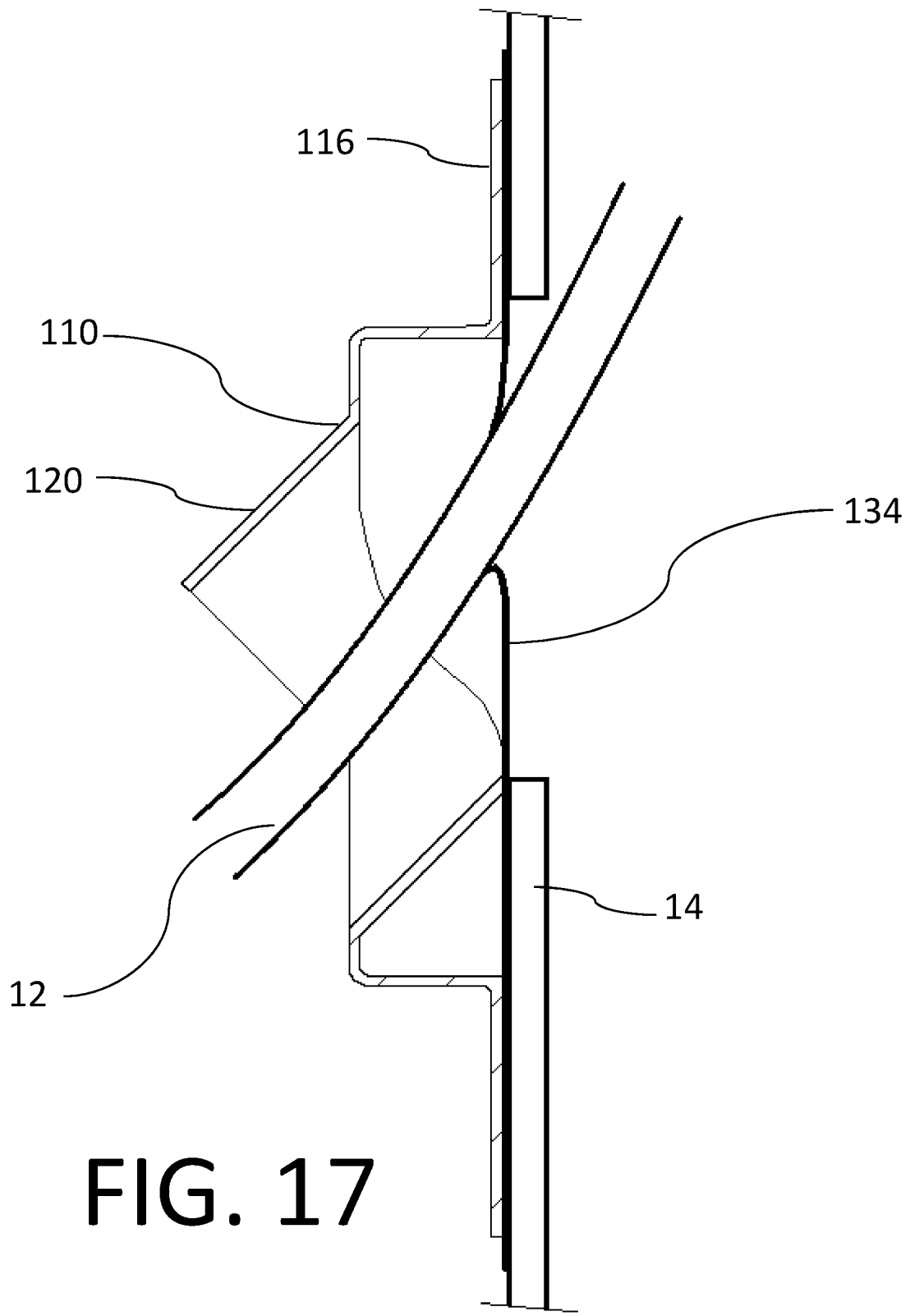
FIG. 17 is a side elevation view in cross section of an impermeable flexible layer in combination with the flashing hood of FIG. 13.
Figure 18:
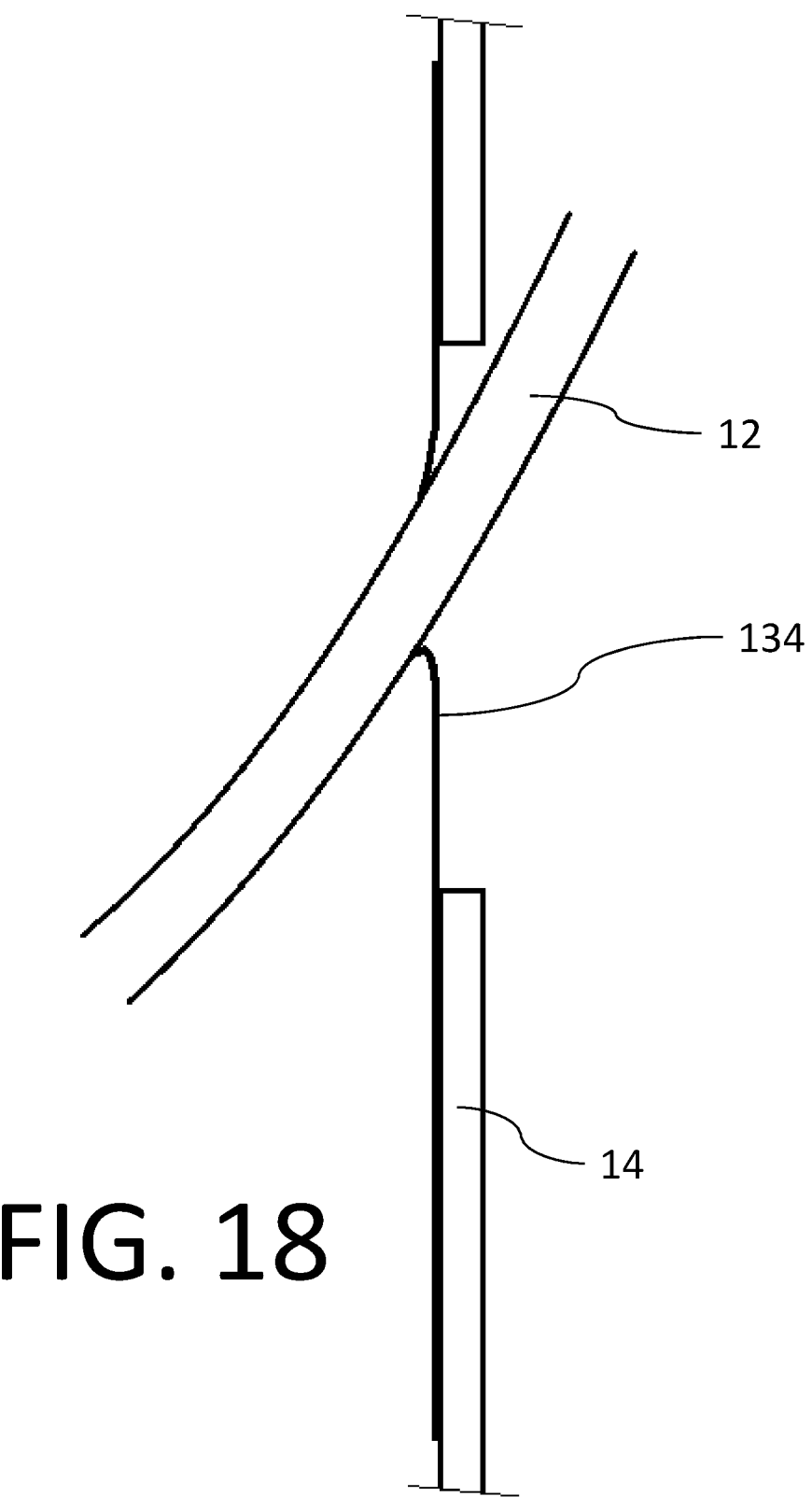
FIG. 18 is an elevated view in cross section of an impermeable flexible layer sealing against utility lines.
Figure 19:
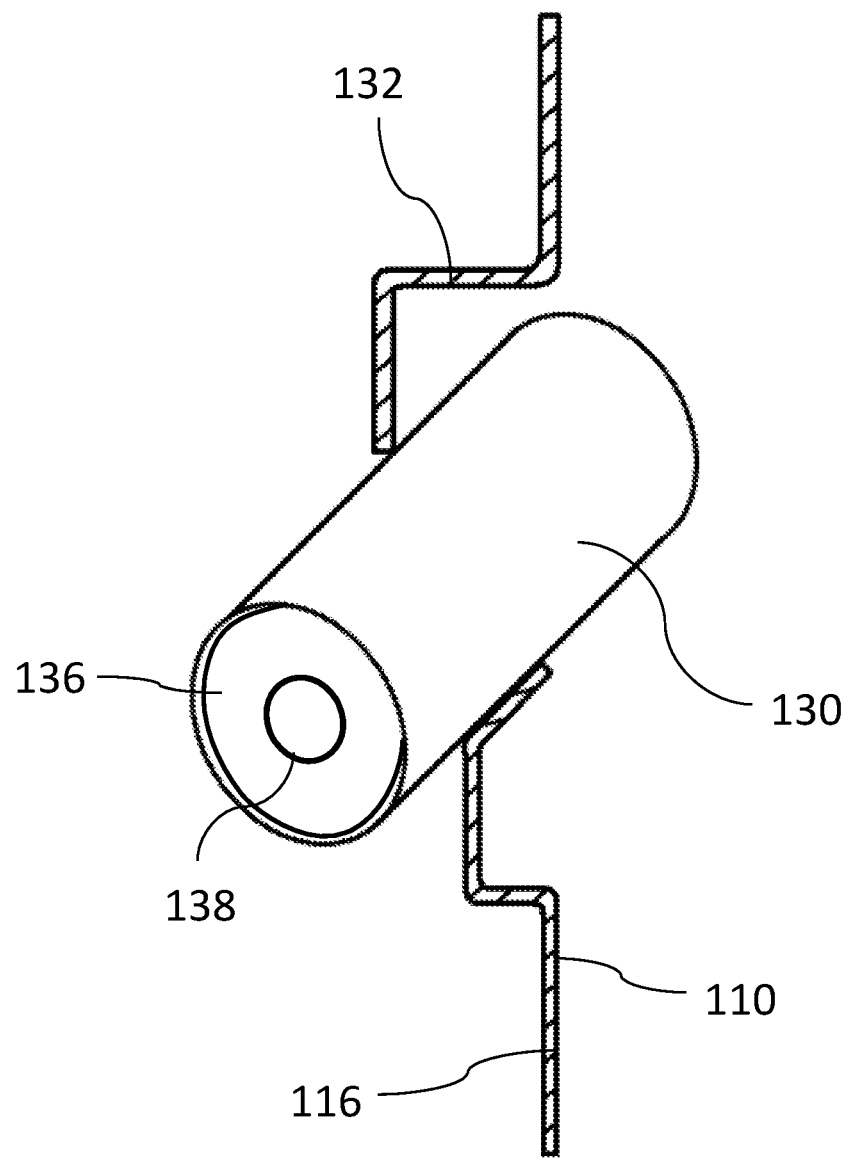
FIG. 19 is a side elevation view in partial cross section of a flashing hood for utility lines with an extension in an alternative configuration.

Referring to FIG. 9, FIG. 17, and FIG. 18, flashing hood 110 is shown with an impermeable flexible layer 134 mounted to plated body 116 on the side opposite the hood body 120. Impermeable flexible layer 134 may have a sealing aperture that seals against one or more utility lines 12 when installed. Impermeable flexible layer 134 may also interact with building wrap 44 to form a vapour barrier. In other embodiments, such as the one shown in FIG. 19 flashing hood 110 may have a resilient seal 136 that is insertable within an end of extendable sleeve 130, resilient seal 136 having a sealing aperture 138 that seals against one or more utility lines 12 when installed.

Figure 20:
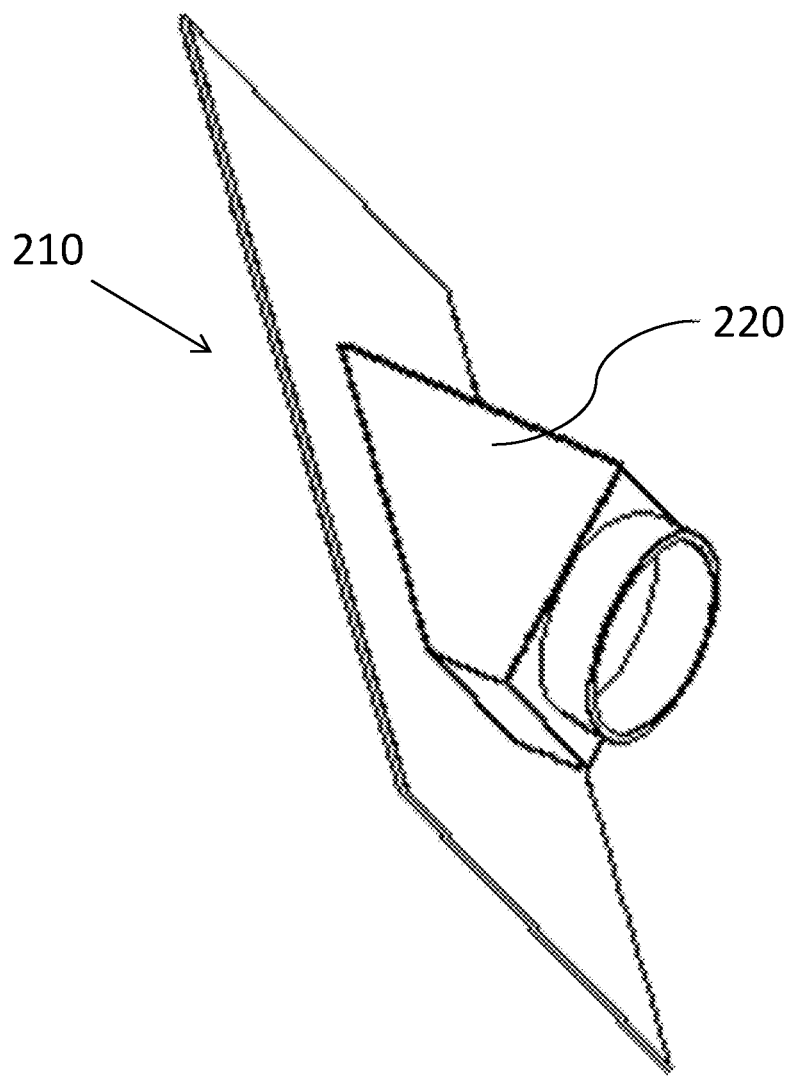
FIG. 20 is a front perspective view of another alternative flashing hood for utility lines.
Figure 21:
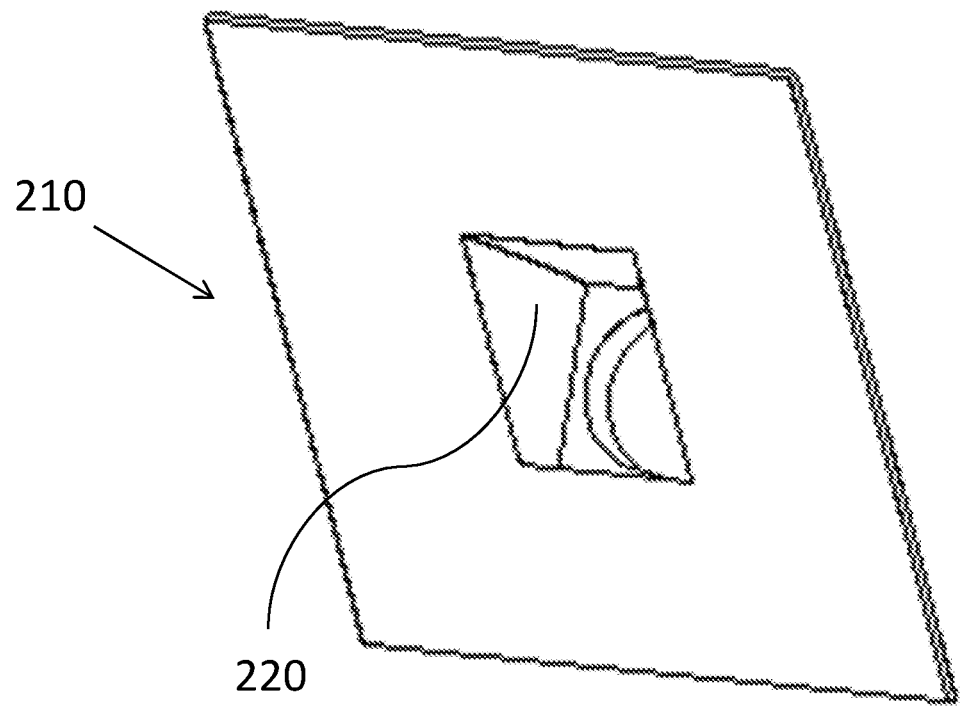
FIG. 21 is a rear perspective view of the flashing hood of FIG. 20.
Figure 22A:
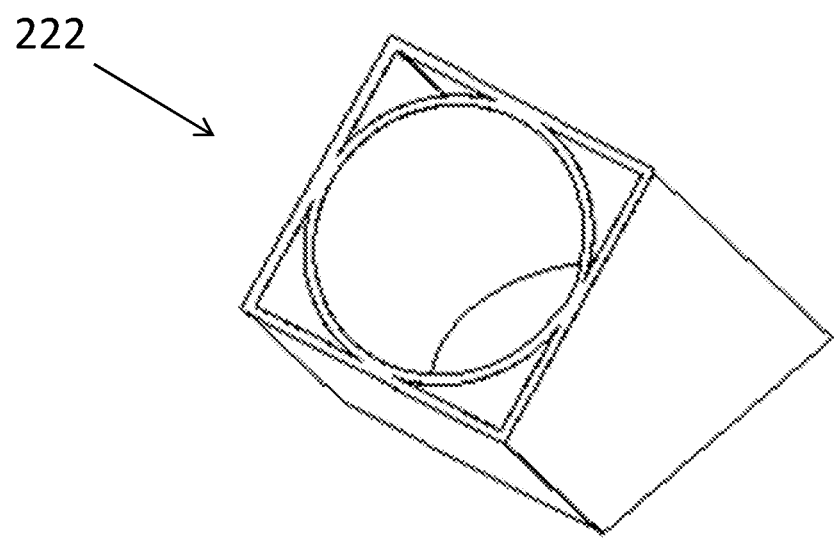
FIGS. 22a and 22b are perspective views of an extension for the flashing hood shown in FIG. 20.
Figure 22B:
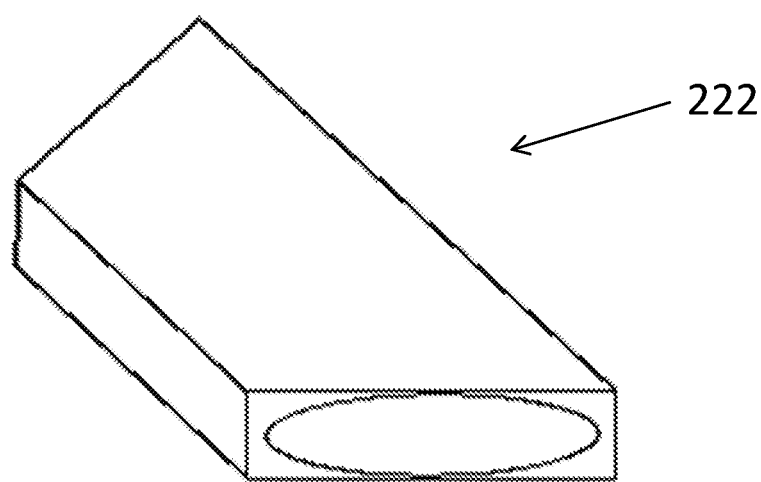
Figure 23:
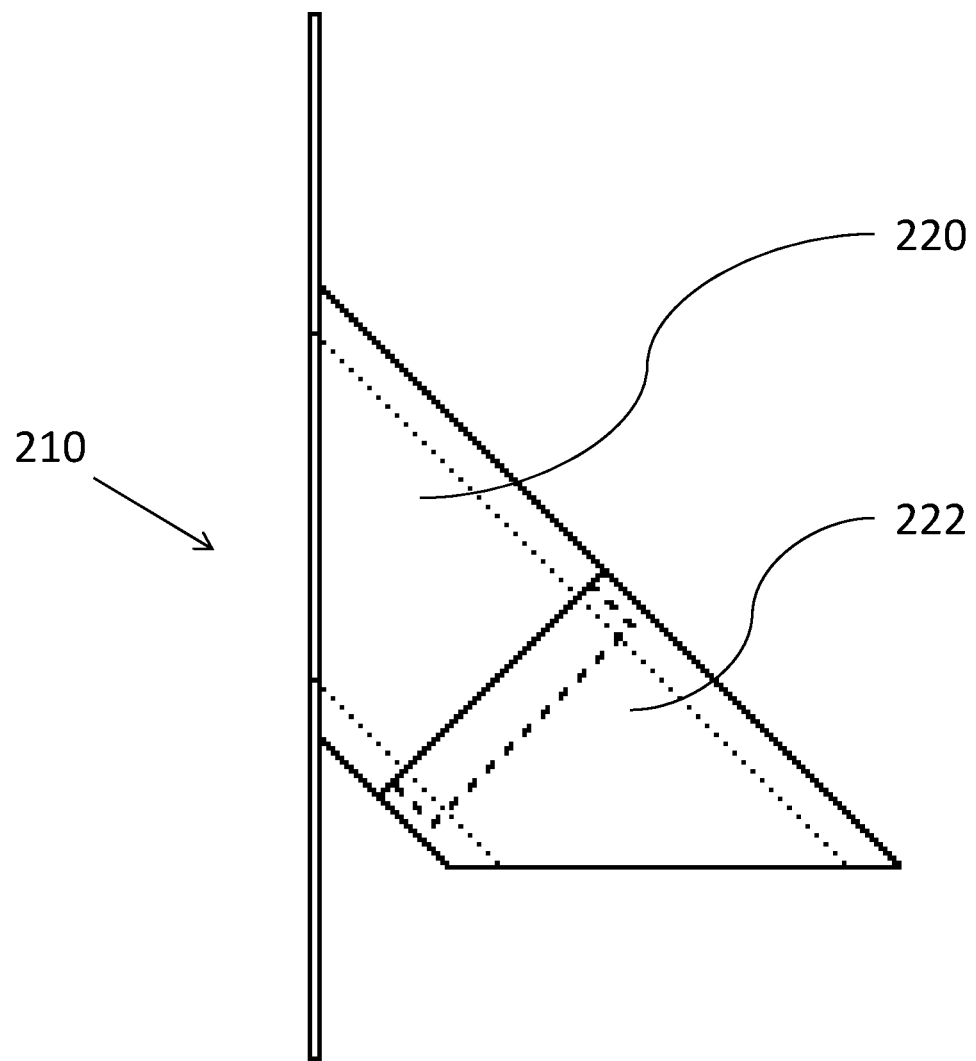
FIG. 23 is a semi-transparent, elevated side view of the flashing hood of FIG. 20 with the extension of FIG. 22a attached.
Figure 24:
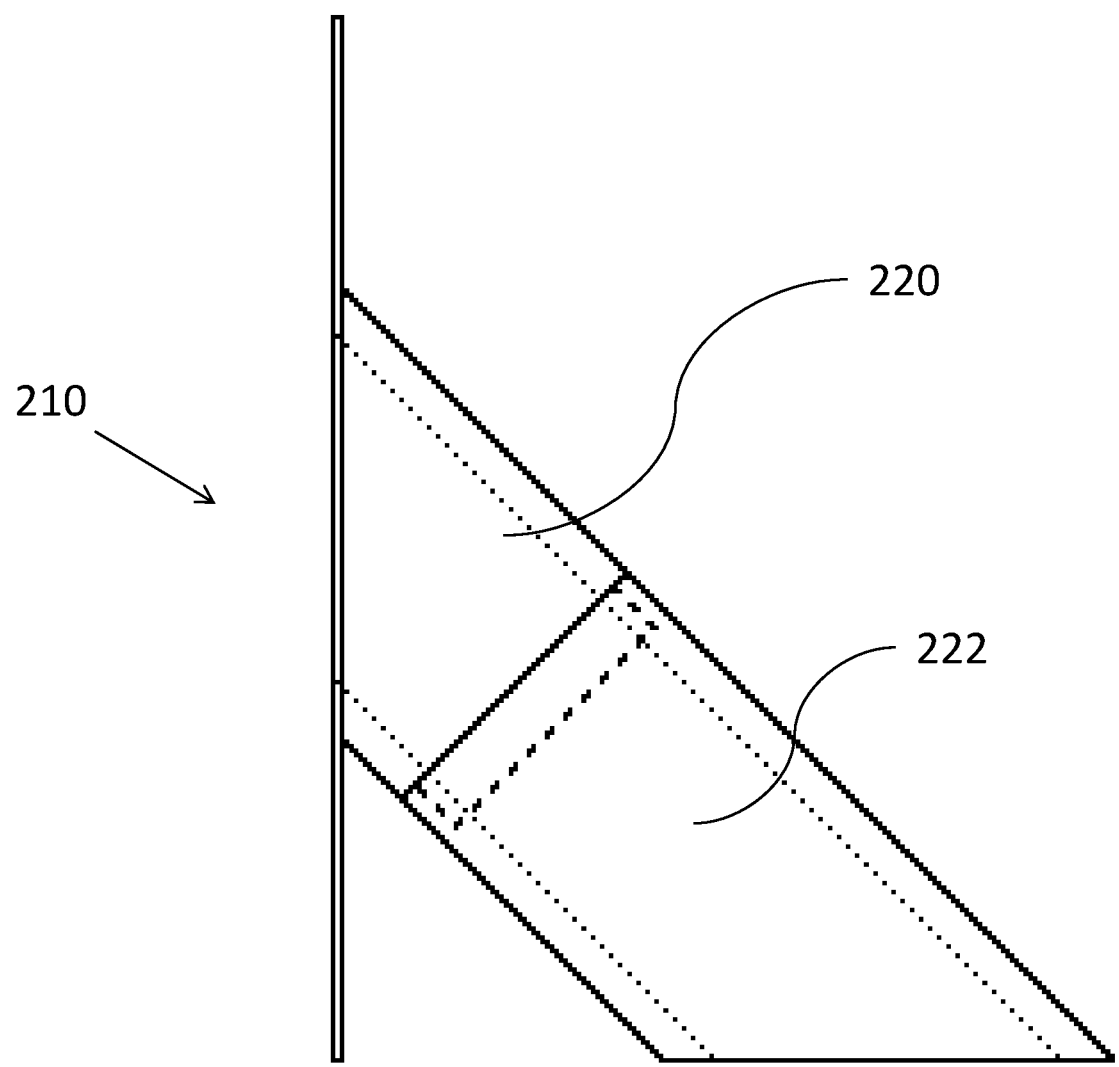
FIG. 24 is a semi-transparent elevated side view of the flashing hood of FIG. 20 with the extension of FIG. 22b attached.

Referring to FIG. 20 and FIG. 21, a hood body 220 is shown that has a rectangular cross section, and at the end of hood body 220 the cross section is changed to circular. This profile allows for hood extensions 222, as shown in FIG. 22a and FIG. 22b to be attached to hood body 220 to provide hoods of varying length. FIG. 23 and FIG. 24 show two hood extensions 222 attached to hood body 220.

Figure 26:
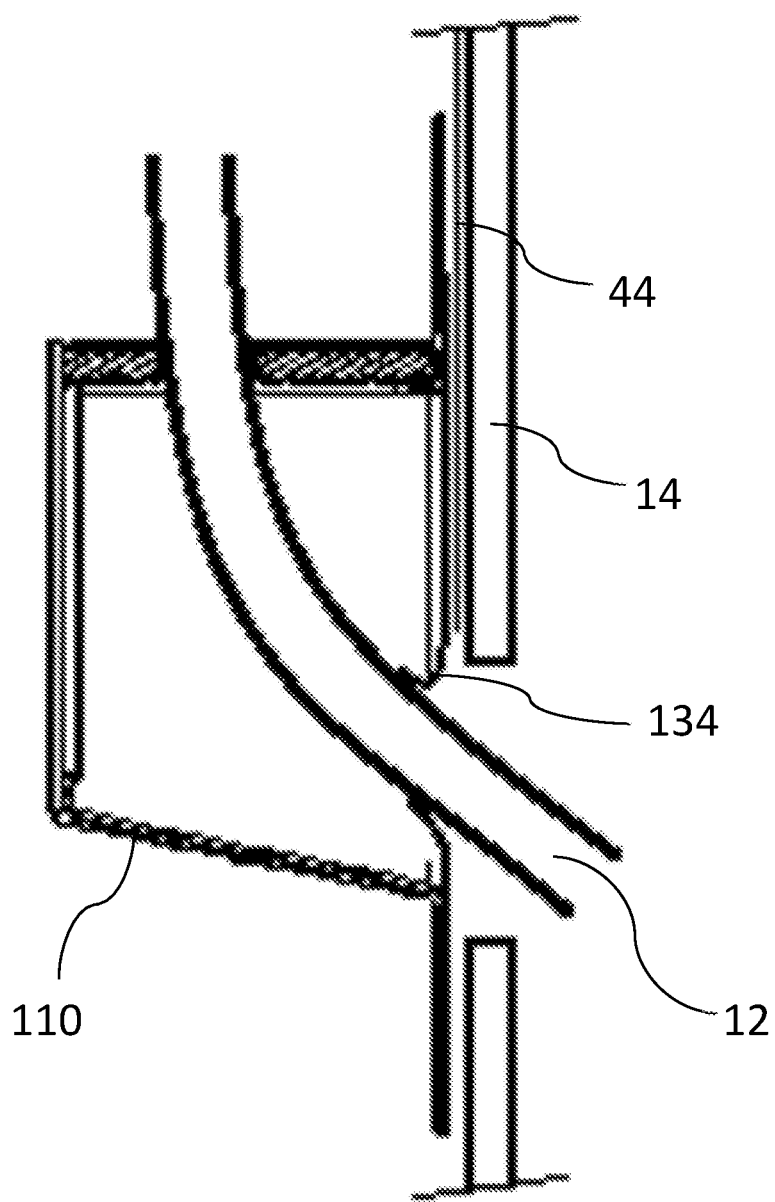
FIG. 26 is a cross-sectional side elevation view of an interior flashing hood.

Referring to FIG. 17, flashing hood 110 is shown without an extension 130. An impermeable flexible layer 134 may be mounted to plate body 116 opposite hood body 120, impermeable flexible layer 134 having a sealing aperture that seals against one or more utility lines 12 when installed. For example, impermeable flexible layer 134 may be a thin sheet of polymer material having an opening with a perimeter that is smaller than the perimeter of the utility line 12. Impermeable flexible layer 134 may be an elastic material that stretches to form a seal around utility line 12, or impermeable flexible layer 134 may be inelastic, and utility line 12 may be compressed in order to form a seal against the sealing aperture. As shown in FIG. 9, impermeable flexible layer 134 may be used in combination with a barrier material such as building wrap 44, and wall 14 may be covered with building wrap 44 and impermeable flexible layer 134 may overlap building wrap 44 on wall 14 of the building. It will also be understood that if flashing hood 10 is installed on the interior of a building, impermeable flexible layer 134 may instead overlap with an interior barrier material such as an interior vapour barrier. FIG. 26 depicts one example of an interior flashing hood 110. It will be understood that any of the embodiments depicted herein may be used as an interior flashing hood 110.

Figure 25:
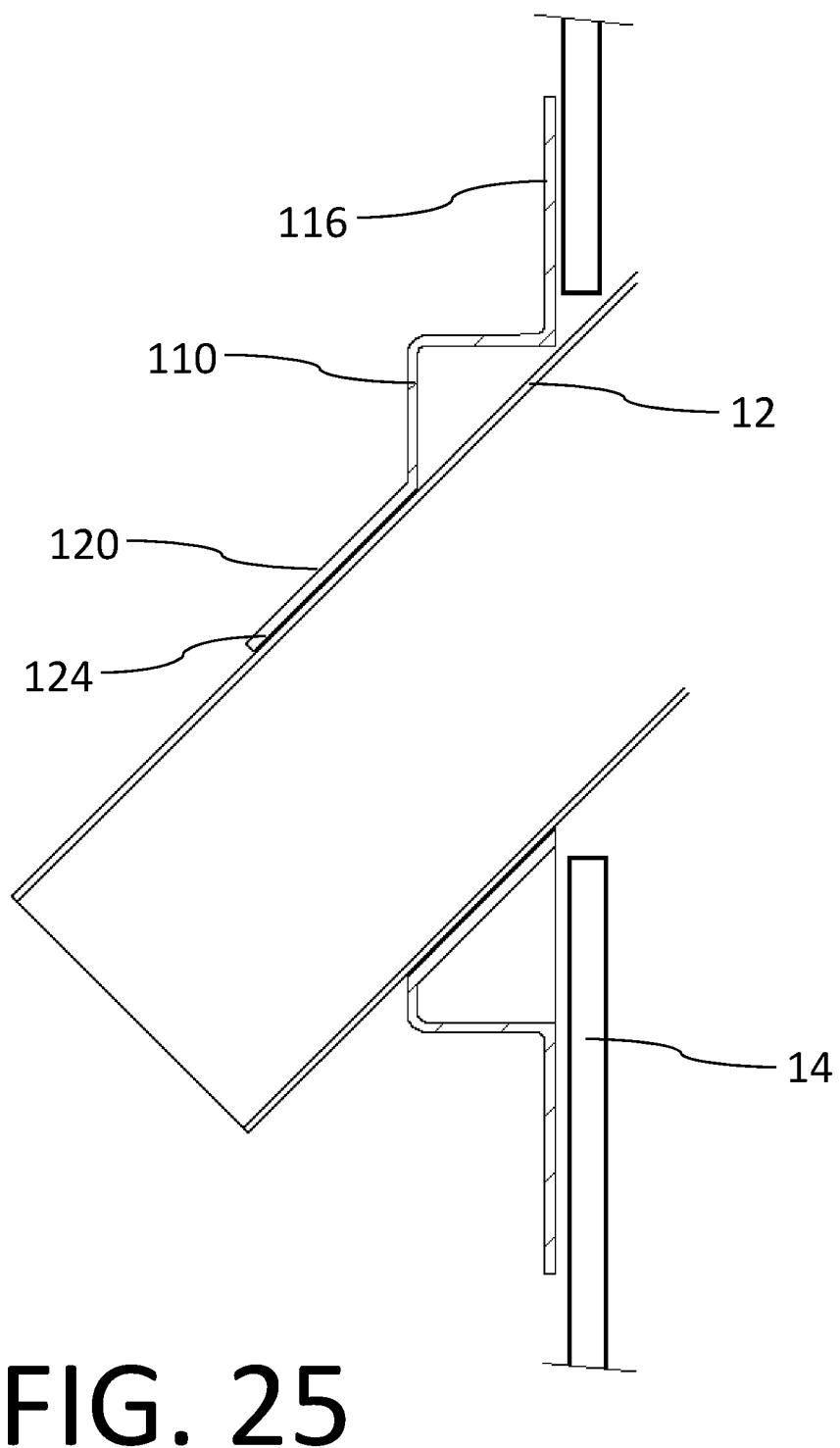
FIG. 25 is a cross-sectional side elevation view of a flashing hood having a large diameter utility line.

Referring to FIG. 25, flashing hood 110 may be used with large diameter utility lines 12 such as a drain pipe. As shown, utility line 12 has an outer perimeter, and utility passage 124 has an interior perimeter that is similar to the outer perimeter of utility line 12. In this case, utility line 12 is friction fit within flashing hood 110. The close fit between utility passage 124 and utility like 12 provides a shingling effect where the two overlap, which prevents fluid from travelling under hood body 120 along utility line 12.

Referring to FIG. 9 and FIG. 26, it will be understood that seals may be formed in a variety of ways, and that these general principles are applicable to all of the embodiments described herein. Utility line 12 may be rigid or flexible, and may have an elastic or deformable outer layer. For example, if utility line 12 is an air conditioner refrigerant line, it may be covered with insulation. Seals may be formed by removable seal 28, resilient seal 136, or impermeable flexible layer 134 engaging with utility line 12. These seals may either be elastic and stretch to form a seal against utility line 12, or they may be inelastic and rely on a friction fit or the deformation of utility line 12 to form a seal. Where removable seal 28 is formed of a two part construction, it may also be a compressible material that is compressed by removable cover 32 during installation to form a seal. Seals may also be formed in some embodiments by other materials, such as spray foam. A seal may be formed either on the exterior side of the building, or on the interior side of the building. Either the flashing hood or the seal may overlap and tie into either a building wrap material or a vapour barrier used in construction of the building. Any of the embodiments described herein may be combined with a sealing layer similar to impermeable flexible layer 134 that overlaps and interacts with either the exterior building wrap material or the interior building wrap material.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A flashing hood for utility lines passing through a wall of a building, the flashing hood comprising:

a plate body having a plate opening extending therethrough; and an enclosed hood body that surrounds the plate opening, the enclosed hood body comprising:
- a sidewall having a seal-receiving profile along a bottom of the enclosed hood body, and a cover-receiving profile that is spaced from the plate body and above the seal-receiving profile;
- a removable seal that engages the seal-receiving profile, the removable seal having a sealing profile that seals against one or more utility lines when installed; and
- a removable cover that engages the cover-receiving profile, wherein:
  - the removable cover secures the removable seal in engagement with the seal-receiving profile;
  - the sidewall, the removable seal, and the removable cover define an enclosure; and
  - when the removable cover and the removable seal are removed, the sidewall defines an access opening that surrounds the plate opening.

2. The flashing hood of claim 1, wherein the removable seal is rectangular and the sealing profile of the removable seal is circular.

3. The flashing hood of claim 1, wherein the removable seal is bisected through the sealing profile.

4. The flashing hood of claim 1, wherein the removable cover is attached to the sidewall using fasteners.

5. The flashing hood of claim 1, the flashing hood further comprising an impermeable flexible layer mounted to the plate body on a side of the plate body opposite the hood body, the impermeable flexible layer having a sealing aperture that seals against one or more utility lines when installed.

* * * * *